United States Patent [19]

Johnson, Jr. et al.

[11] Patent Number: 5,747,970
[45] Date of Patent: May 5, 1998

[54] BATTERY CHARGER CHARGING TIME CONTROL

[75] Inventors: Robert Michael Johnson, Jr., Lake Zurich; Monefax Joseph Gilot, Addison, both of Ill.

[73] Assignee: Motorola, Inc., Schaumburg, Ill.

[21] Appl. No.: 718,797

[22] Filed: Sep. 24, 1996

[51] Int. Cl.⁶ .................... H02J 7/04; G01N 27/2116
[52] U.S. Cl. ............................... 320/151; 320/155
[58] Field of Search ......................... 320/35, 22, 23, 320/150, 151, 155, 36 FOR; 324/431

[56] References Cited

U.S. PATENT DOCUMENTS

| | | | |
|---|---|---|---|
| 3,852,652 | 12/1974 | Jasinski | 320/150 |
| 4,392,101 | 7/1983 | Saar et al. | 320/156 |
| 4,503,378 | 3/1985 | Jones et al. | 320/161 |
| 4,755,735 | 7/1988 | Inakagata | 320/150 |
| 4,806,840 | 2/1989 | Alexandar et al. | 320/149 |
| 4,843,299 | 6/1989 | Hutchings | 320/125 |
| 5,059,885 | 10/1991 | Weiss et al. | 320/115 |
| 5,061,898 | 10/1991 | Oram et al. | 324/427 |
| 5,315,228 | 5/1994 | Hess et al. | 320/106 |
| 5,391,974 | 2/1995 | Shiojima et al. | 320/150 |
| 5,403,093 | 4/1995 | Flynn, Jr. et al. | 360/150 |
| 5,477,126 | 12/1995 | Shiojima | 320/156 |
| 5,519,302 | 5/1996 | Mino et al. | 320/148 |
| 5,519,303 | 5/1996 | Goedken et al. | 320/150 |
| 5,563,496 | 10/1996 | McClure | 320/128 |

FOREIGN PATENT DOCUMENTS 2354178 5/1974 Germany.
2 290 177 12/1995 United Kingdom.

*Primary Examiner*—Peter S. Wong
*Assistant Examiner*—Gregory J. Toatley, Jr.
*Attorney, Agent, or Firm*—Randall S. Vaas

[57] ABSTRACT

A circuit (103) for charging a battery (101) is connected to an input (126) for inputting a signal indicative of a temperature of the battery. A switch (108) selectively supplies power to the battery under the control of a control signal. A microcontroller (140) calculates a rate of change of the temperature signal and stores a peak rate of change during a battery charging interval. The microcontroller is operable to control the switch to disable charging of the battery when the temperature rate of change drops below the peak value by a rate of change threshold amount.

14 Claims, 3 Drawing Sheets ns/br>
BATTERY CHARGER CHARGING TIME CONTROL

FIELD OF THE INVENTION

The present invention pertains to battery chargers.

BACKGROUND OF THE INVENTION

A variety of battery charger circuits are known for supplying current to a rechargeable battery. These circuits may be implemented in battery chargers or as part of a battery powered device. For example, portable computers, personal digital assistants (PDAs), and portable communication devices such as cellular telephones, two-way radios, and cordless telephones, and the like, can include a charging circuit.

Regardless of the type of device in which the charging circuit is employed, it is desirable that the charging circuit provide optimum charging current for all different types of rechargeable batteries. Rechargeable batteries are constructed of cells within a common housing, and battery types are classified by the composition of the cells. Examples of cell compositions include nickel-cadmium (NiCd) and nickel metal hydride (NiMH).

A difficulty in providing optimum charging for batteries is that the time period required to fully charge a battery is dependent upon the battery type, the extent to which the battery has been discharged, and the magnitude of the charging current applied to the batteries. If charging continues past the fully charged condition, unless the supply current is very small (e.g., C/30 where C is the capacity of the battery in milliampere-hours (mAH)), the useful life of the battery will be reduced.

It is known to use a "fast charger" to charge batteries according to the optimum characteristics. These chargers inject a relatively high level current and cut-off charging at a predetermined point according to the battery type. "Trickle chargers" inject a small level of current for a much longer time period than "fast chargers". Some chargers apply both fast and trickle charging depending upon the battery to be charged and the desired charging characteristic. A problem with fast chargers is that they require relatively high power supplies, which necessitate the use of expensive power regulators.

It is important to cut-off charging at the optimum point to insure that the battery is fully charged. If charging is continues beyond the optimum point, the battery's useful life will be reduced. If charging is cut-off prior to the optimum point, then the battery will not be fully charged. Fast chargers detect the peak, and cut-off charging at that point. However, these chargers inject relatively high current levels and use expensive A/D (analog-to-digital) converters to identify the appropriate cut-off point. Where it is desirable to provide a battery charger in a lower cost device, the cost of the fast charger circuitry can be too expensive.

Accordingly, there is a need for a charging system that provides optimum charging for the different types of rechargeable batteries commercially available but uses low cost circuitry.

DETAILED DESCRIPTION OF A PREFERRED EMBODIMENT

Figure 1:
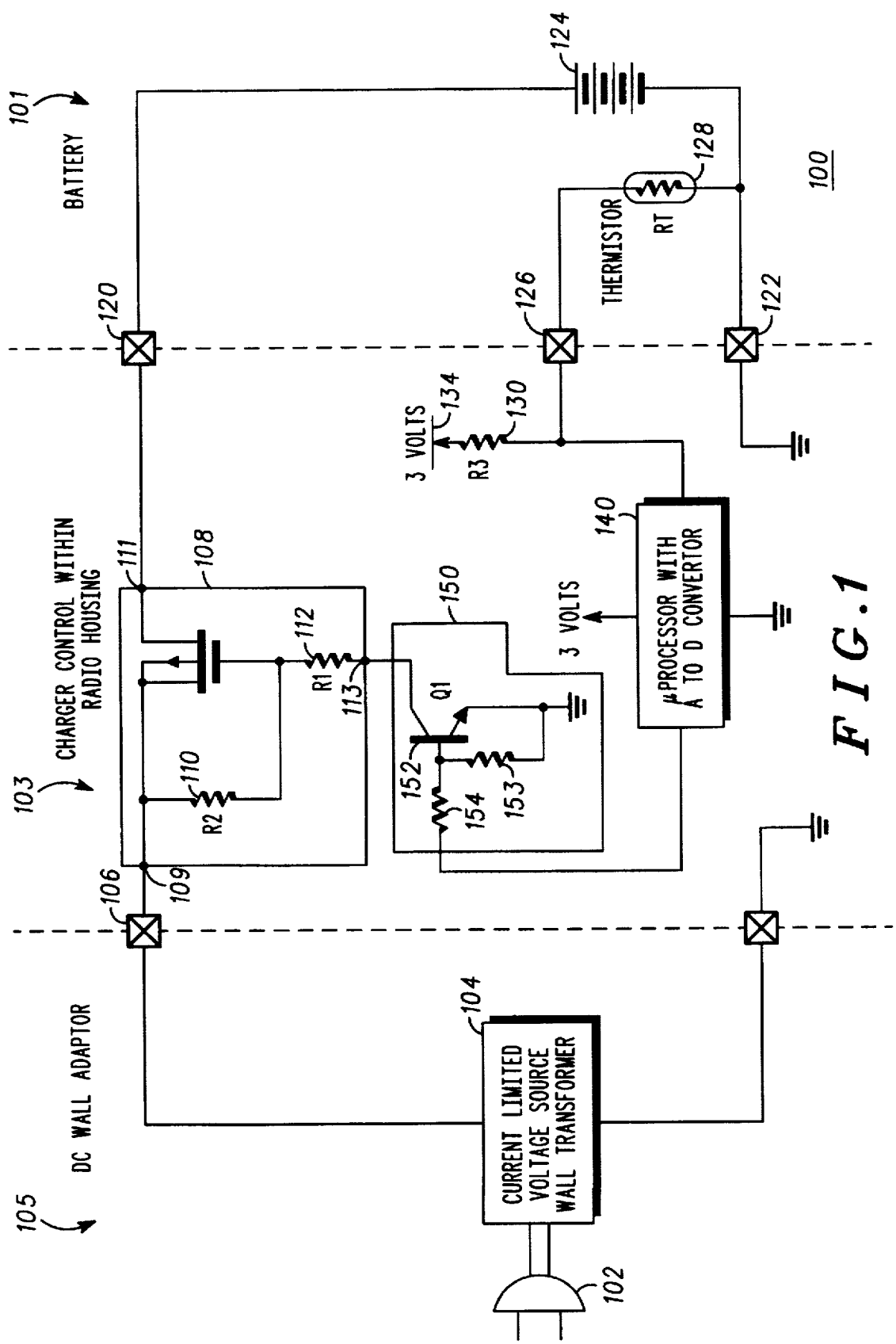
FIG. 1 is a circuit diagram illustrating a battery charger.

The battery charger arrangement 100 (FIG. 1) includes a power source such as wall adapter 105, a controller such as charger control circuit 103, and a battery 101 to be charged. The wall adapter 105 and the charger control circuit 103 can be provided in separate housings, or in a common housing.

An input 102 is for connection to a power supply (not shown), such as an AC power source, a vehicle power supply (such as a cigarette lighter), or the like. The power supply is converted to a regulated power source at node 106 by a power regulator 104. The power regulator is preferably a current limited voltage source producing a current of about 300 mA (milliamps). The power regulator can be implemented using any conventional circuitry, such as a switched power supply, a transformer, or the like.

A switch 108 has an input 109 connected to node 106 and an output 111 connected to a battery 101 to be charged. The illustrated switch is a metal oxide semiconductor field effect transistor (MOSFET), it can be implemented using a bipolar switch, optical switch, or the like. The MOSFET gate is connected to a control input 113 by a resistor 112. The gate is connected to the drain of the MOSFET by a resistor 110. The MOSFET can be implemented using an MMDF2P01HD MOSFET commercially available from Motorola, Inc., and is preferably a normally open switch.

The battery to be charged can be a NiMH, NiCd, or the like. The battery has a positive terminal 120 and a negative terminal 122 connected to cells 124. The positive terminal is connected to the output of switch 108. The negative terminal is connected to ground. The battery also includes a thermistor 128 connected to terminal 122 and a temperature indicative signal at node 126. The thermistor impedance depends upon the temperature of battery cells 124.

Node 126 is connected to a resistor 130. Resistor 130 and thermistor 128 provide a voltage divider between a supply 134 and ground. As the impedance of thermistor 128 varies, the voltage at node 126 changes.

A microcontroller 140 is connected to node 126. The microcontroller includes an A/D converter which converts the voltage level at node 126 to a digital signal. The microcontroller includes a memory (not shown) storing temperature information such as a temperature rate of change threshold value and a A/D temperature threshold, both of which are described in greater detail hereinbelow. The microcontroller memory will also store measurements taken during the charging supply period, such as To, a peak value PK, and measurements at various sampling periods, as is also described in greater detail hereinbelow. The microcontroller can be implemented using an MC68HC11E9 microprocessor commercially available from Motorola, Inc. Alternatively, the microprocessor can be implemented using other circuitry. The advantage of the above Motorola microprocessor is that it is a relatively low cost processor that can be used to control call processing and circuit control in a cellular telephone having an internal charger, and it can also be used for the battery charger control. This microprocessor includes a successive approximation A/D converter, the output of which is stepped, and the delta from one level to the next level will be referred to herein as a step. Of course, other microprocessor or logic circuitry can be used to implement the controller.

An output of the microcontroller 140 is connected to switch driver 150. The switch driver 150 includes a bipolar transistor. The collector is connected to the control input of the switch 108. Resistors 153 and 154 are connected to the base and emitter of the transistor 152 in a standard configuration. The switch buffers the output of the microprocessor from the input 113 of the switch 108.

Figure 2:
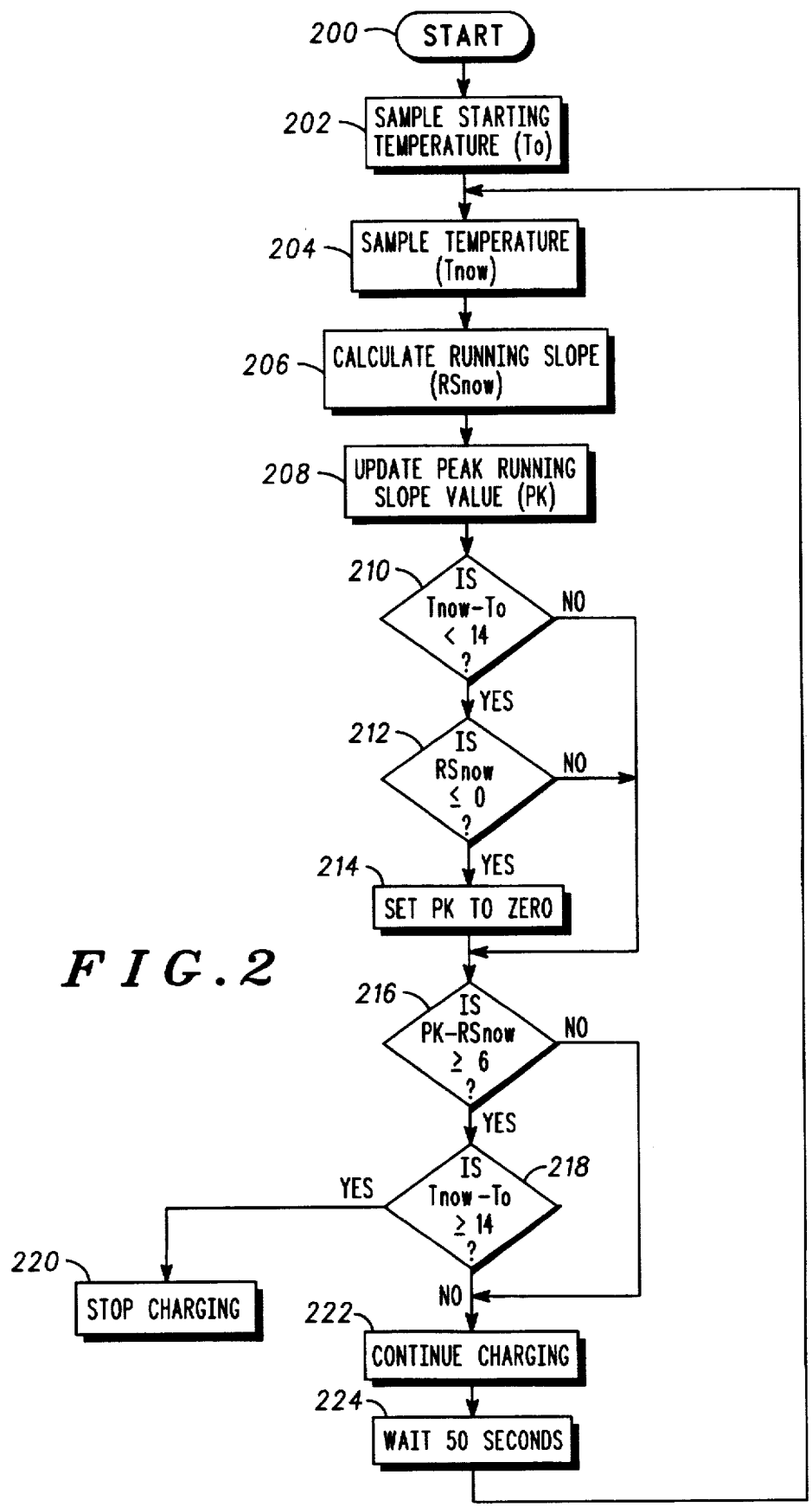
FIG. 2 is a flow chart illustrating operation of the battery charger according to FIG. 1.

The operation of the charger control circuit 103 will now be described with reference to FIG. 2. Upon the initiation of charging in block 200, the microcontroller 140 detects the signal To representative of the temperature of the battery at block 202. The signal indicative of the temperature is the voltage at node 126. The signal is converted to a digital signal by the A/D converter in the microcontroller 140.

The reading of To may be taken at a time other than the beginning of charging. It may also be retaken if it becomes known that the ambient temperature of the battery has changed significantly from when the previous reading of To had been taken. The ambient temperature will be assumed to have dropped significantly if Tnow is below To, at which time Tnow will be stored as To. Alternatively, an external ambient temperature sensor can be employed to measure ambient temperature and determine if the ambient temperature has dropped significantly.

The microcontroller 140 then measures the voltage Tnow at node 126 the next sample instant, as indicated in block 204. The microcontroller 140 calculates the running slope RSnow for the new sample in block 206. The running slope is the rate of change of the temperature, or the first derivative of the temperature signal, and is preferably measured as described hereinbelow. The microcontroller will determine if the new running slope is greater than the stored running slope, in block 208. If it is greater than the stored running slope, then the new running slope is stored as the peak running slope.

The microcontroller 140 will then determine if Tnow is more than 14 steps greater than To, in decision block 210. If it is more than 14 A/D converter steps greater than the measurement To for the charging interval, then the microcontroller 140 determines if the running slope is less than or equal to 0, in decision block 212. If it is less than or equal to 0, then the peak value PK for the charging interval (which is stored in a memory not shown) is set to zero in block 214.

If it was determined in block 210 that Tnow is 14 or more steps greater than To, or if it was determined in block 212 that the running slope is positive (i.e., the temperature is still rising), or following the storing of a peak value of zero in block 214, the microcontroller 140 will determine if the running slope has dropped a predetermined threshold amount, which in the reduction to practice is 6 or more steps, from the peak value PK stored for the charging interval. If it is not, then the microcontroller will continue charging the battery.

If the peak slope PK is 6 or more steps greater than the running slope RSnow, as determined in block 216, then the microcontroller 140 again determines if the current temperature is 14 or more A/D steps greater than the temperature at To in block 218: that is the temperature signal is now greater than the measurement To by the predetermined temperature threshold. If it is, then microcontroller 140 stops charging the battery cells 124 in block 220 by controlling switch 108 to open. If it is determined in block 218 that the temperature A/D count is not 14 steps greater than To, the microcontroller 140 will continue charging by holding the switch 108 closed, in block 222. The microcontroller 140 will then wait a predetermined time period, such as 50 seconds, in block 224 before taking the next sample at block 202. The 50 second interval is the period between samples.

The microcontroller 140 can advantageously calculate the running slope over a plurality of sampling times. For example, the temperature measurement taken at six sampling periods can be used as follows:

$$RS = (T(now) + T(now-50) + T(now-100)) - (T(now-300) + T(now-350) + T(now-400))$$

The first sum represents the three most recent measurements, one being Tnow, and the other two being the immediately preceding measurements. Adding the three together gives a greater amplitude than a single measurement will give. The second sum represents three consecutive old measurements, which in the illustrated equation were taken 400 seconds earlier, 350 seconds earlier and 300 seconds earlier. By adding the three values together, a greater amplitude is generated. The difference between the measurements will be the running slope. It will be appreciated that at the beginning of the charging interval, if enough time has not elapsed to calculate a running temperature slope, then charging can continue until a calculation can be made, which in the illustrated times, would be 400 seconds. This 400 second time period is the running slope measurement time interval. Those skilled in the art will recognize that the spacing described is an example, and the actual spacing of samples and number of measurements in each summation can be different without varying from the invention. The spacing of the measurements provides noise immunity.

A large number of measurements will give a greater temperature amplitude, which can be processed in a low cost A/D converter where the charging current is C/3 of the capacity of the battery. The charging current of the intermediate rate charger disclosed herein would be approximately 300 mA, which is C/3, and allows lower cost wall adapter 105 to be used with a charger control circuit 103 in a device, such as a radiotelephone, but gives lower amplitude readings which are harder to sense with the A/D converter. This is distinguished from a fast charger. Where the capacity of the battery is 100 mAH, a fast charger would inject a current of a magnitude of 1000 mA, which is 1 C, and provides greater amplitude readings as the temperature will rise faster. A trickle charger would inject current at a magnitude of approximately 100 mA, or C/10, and would provide even smaller amplitude readings than the intermediate rate charger.

Thus the charging circuit performs three functions. The charging is interrupted when the running temperature slope drops a rate of change threshold amount below the stored peak threshold for a charging interval. Secondly, each time the running slope is zero, the previous peaks are set to zero if the battery has risen less than a predetermined amount since temperature To was taken. The processor waits for a rise in temperature at least equal to a predetermined threshold value, such as 14 A/D steps which corresponds to approximately 5 degrees Celsius, before considering when to stop charging. This later consideration is important for preventing the charger from stopping prematurely.

Figure 3:
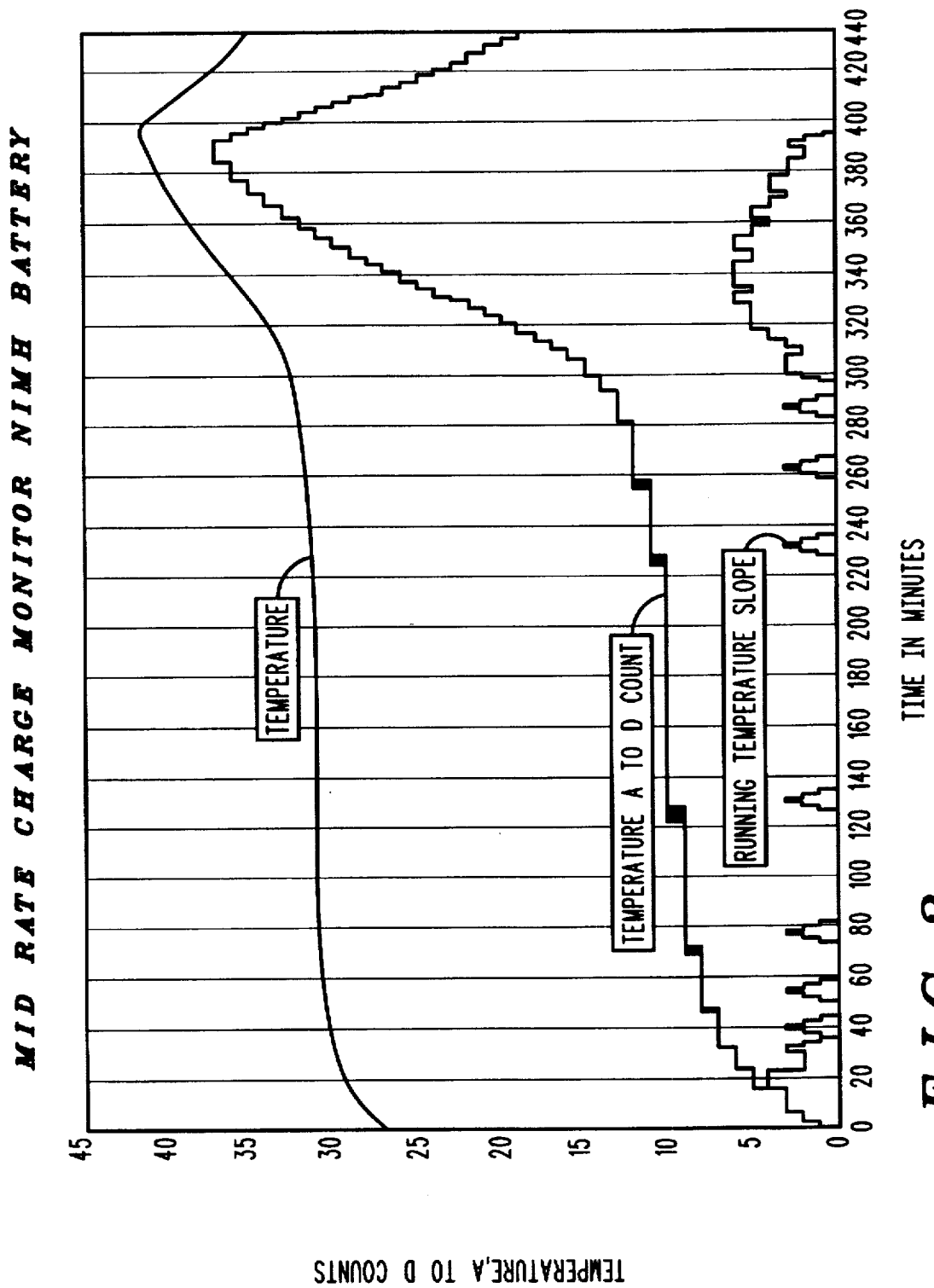
FIG. 3 is a plot of temperature, temperature A/D output and running temperature slope for the circuit according to FIG. 1.

With reference to FIG. 3, the initiation of charging occurs at time To. The temperature A/D count (the A/D in microcontroller 140) is proportional to the temperature of the battery cells 124. This temperature will rise initially until it levels off (70 to 240 minutes). During this time period, the running temperature slope will also rise quickly and drop off to zero. To avoid a false trip at this point when the peak rises initially and then drops to zero over the first 40 minutes, the microcontroller 140 will ignore the early measurements. These measurement are ignored as the threshold temperature A/D count, namely 14 in a reduction to practice, has not been reached. Each time the slope reaches 0, the peak is reset. This prevents a sudden rise in temperature passing through the threshold (at time 300) from stopping charging because the slope (0) is less than previous peaks such as that occurring at time 10 minutes. By resetting the slope each time it reaches 0, the slope drop threshold will have to be on a falling curve, insuring that it will occur after the peak temperature is reached. The turn off point occurs when the running temperature slop drops by the slope threshold amount, namely 6 A/D steps, which occurs approximately 390 minutes after charging started.

Accordingly it can be seen that a charger circuit is disclosed that stops charging a battery shortly after a peak temperature is reached. The charger employs low cost components to provide monitoring and power supply functions to the battery. The charger can be implemented as part of a communication device, without adding significantly to the cost of the device.

We claim:

1. A circuit for charging a battery, comprising:
   a temperature signal input for inputting a temperature signal indicative of a temperature of the battery;
   a switch having an input to couple to a power source and an output for coupling to the battery, the switch to selectively supply power to the output under control of a control signal; and
   a controller coupled to the temperature signal input and to the switch to generate the control signal, the controller calculating a rate of change of the temperature signal and storing a peak rate of change value during a battery charging interval, the controller to generate the control signal to control the switch to disable charging of the battery when the rate of change drops below the peak rate of change value by a temperature rate of change threshold amount.

2. The circuit as defined in claim 1, wherein the controller clears the peak rate of change value stored during the charging interval each time the rate of change drops to zero during the battery charging interval.

3. The circuit as defined in claim 2, wherein the controller saves an initial temperature measurement upon initiation of the charging interval.

4. The circuit as defined in claim 3, wherein the controller ignores detection of a rate of change below the peak rate of change value by the temperature rate of change threshold amount if the temperature signal is not greater than the initial temperature value by a predetermined temperature threshold amount.

5. The circuit as defined in claim 4, wherein the controller calculates the rate of change as a difference between a first sum of temperature signal measurements and a second sum of temperature signal measurements.

6. The circuit as defined in claim 1, wherein the controller saves an initial temperature measurement upon initiation of the charging interval.

7. The circuit as defined in claim 6, wherein the controller ignores detection of a rate of change below the peak rate of change value by the temperature rate of change threshold amount if the temperature signal is not greater than the initial temperature value by a predetermined temperature threshold amount.

8. The circuit as defined in claim 1, wherein the controller calculates the rate of change as a difference between a first sum of temperature signal measurements and a second sum of temperature signal measurements.

9. The circuit as defined in claim 1, wherein the controller includes an A/D converter and the temperature rate of change is measured as a function of A/D converter steps, and the predetermined rate of change threshold amount is a non-zero number of steps.

10. A method of supplying charging power to a battery having a charging current injection rate capacity, comprising the steps of:
    injecting current into the battery at a an intermediate current rate which is less than the charging current injection capacity;
    measuring a temperature signal indicative of a temperature of the battery;
    monitoring a rate of change of the temperature signal;
    storing a peak value of the rate of change during a charging interval; and
    interrupting charging if the rate of change drops below the peak value by a first non-zero threshold amount.

11. The method as defined in claim 10, wherein the peak value is reset to zero each time the rate of change returns to zero during the charging interval.

12. The method as defined in claim 11, wherein interruption does not occur until the temperature signal is greater than an initial measurement by a second non-zero threshold amount.

13. The method as defined in claim 10, wherein the intermediate current rate is significantly less than the charging current injection capacity and greater than a trickle charge current injection rate.

14. The method as defined in claim 10, wherein the intermediate current rate is approximately one third the charging current injection capacity.

* * * * *